US011201851B2

(12) United States Patent
Hoshino

(10) Patent No.: US 11,201,851 B2
(45) Date of Patent: Dec. 14, 2021

(54) INFORMATION PROCESSING DEVICE AND NON-TRANSITORY COMPUTER READABLE MEDIUM

(71) Applicant: FUJIFILM Business Innovation Corp., Tokyo (JP)

(72) Inventor: Takashi Hoshino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/734,410

(22) Filed: Jan. 6, 2020

(65) Prior Publication Data

US 2021/0006536 A1 Jan. 7, 2021

(30) Foreign Application Priority Data

Jul. 3, 2019 (JP) ............................ JP2019-124198

(51) Int. Cl.
*H04L 29/12* (2006.01)
*H04W 8/26* (2009.01)
*H04L 29/08* (2006.01)

(52) U.S. Cl.
CPC ........ *H04L 61/2076* (2013.01); *H04L 61/103* (2013.01); *H04L 61/1541* (2013.01); *H04L 61/2015* (2013.01); *H04L 69/329* (2013.01); *H04W 8/26* (2013.01)

(58) Field of Classification Search
CPC ............... H04L 61/103; H04L 61/1541; H04L 61/2015; H04L 61/2076; H04L 69/329; H04W 8/26
See application file for complete search history.

(56) References Cited

U.S. PATENT DOCUMENTS 6,845,094 B1 * 1/2005 Zhang ............... H04L 29/12283 370/349
7,337,238 B2 2/2008 Nishio
7,747,779 B2 6/2010 Nishio
2011/0010463 A1 * 1/2011 Christenson ...... H04L 29/12066 709/245
2012/0030374 A1 * 2/2012 Horino .................... H04L 43/50 709/245
2015/0009998 A1 * 1/2015 Jeong ................ G06Q 30/0201 370/392

FOREIGN PATENT DOCUMENTS

JP 2000183874 6/2000
JP 2004048462 2/2004
JP 2008028798 2/2008

* cited by examiner

*Primary Examiner* — Gil H. Lee
(74) *Attorney, Agent, or Firm* — JCIPRNET

(57) ABSTRACT

An information processing device includes storage and a controller. In a case where a change of network address occurs in a communication channel, the storage stores a pre-change network address for a terminal connected to the communication channel in association with a post-change network address for a terminal whose network address has changed. In a case where communication to a terminal is performed using the pre-change network address, the controller controls the communication by using the storage such that, in a case where the network address of the terminal has not changed, the communication is performed as-is, whereas in a case where the network address of the terminal has changed, the pre-change network address is converted to the post-change network address to communicate with the terminal.

10 Claims, 17 Drawing Sheets

| MAC (510) | OLD IP (520) | NEW IP (530) |
|---|---|---|
| 11:11:11:11:11:11 | 10.0.1.10 | 10.0.9.1 |
| 22:22:22:22:22:22 | 10.0.1.100 | |

| LAN (910) | COMMUNICATION TO NEW IP (920) |
|---|---|
| 10.0.2.0/24 | N |
| 10.0.3.0/24 | Y |

| MAC (1210) | OLD IP (1220) | NEW IP (1230) | LAST DATE/TIME OLD IP USED (1240) | OLD IP-USING LIST (1250) |
|---|---|---|---|---|
| 11:11:11:11:11:11 | 10.0.1.10 | 10.0.9.1 | | |
| 22:22:22:22:22:22 | 10.0.1.100 | 10.0.9.100 | TODAY | 10.0.2.10 |

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-124198 filed Jul. 3, 2019.

BACKGROUND

(i) Technical Field

The present disclosure relates to an information processing device and a non-transitory computer readable medium.

(ii) Related Art

Japanese Unexamined Patent Application Publication No. 2004-048462 addresses the issue of providing a mechanism that reliably recognizes that a peripheral device has joined a network and that the IP address of the peripheral device has changed, and on the basis of the recognized result, changes settings in a control program that controls the peripheral device. Japanese Unexamined Patent Application Publication No. 2004-048462 discloses a network device that manages a combination of a MAC address, which is one example of static identification information, and an IP address, which is one example of variable identification information, and recognizes a change in the combination.

Japanese Unexamined Patent Application Publication No. 2000-183874 discloses a network management server system that supports only one type of communication protocol on a network in which multiple types of communication protocols coexist, and enables the network management server system to manage the network adopting another communication protocol. Japanese Unexamined Patent Application Publication No. 2000-183874 addresses the issue of minimizing changes to the network management server system. On a network in which the two communication protocols IPv4 and IPv6 coexist and a network management server system supporting IPv4 only is running, an IPv4 address dynamically assigned by an address management server system to a node assigned an IPv6 address is stored in association with the IPv6 address by a network management proxy server system. the network management proxy server system temporarily receives a network management command using the IPv4 address, and then converts and forwards the network management command using the IPv6 address.

Japanese Unexamined Patent Application Publication No. 2008-028798 addresses the issue of devices on the same physical network establishing a connection even if the devices have been statically assigned different IP address spaces. A virtual interface is implemented in a network device, and when the virtual interface is accessed from a terminal (PC), the terminal from which the access originated is dynamically added to the route information as a destination. With this arrangement, bidirectional communication between devices is achieved without changing network settings or the like.

SUMMARY

In the case where the network addresses on a communication channel are changed, depending on the circumstances of the individual terminals, the timing of the network address change in each terminal may be different. For this reason, in the case of communicating using the changed network address, a situation of being unable to communicate with a terminal whose network address has not yet changed may occur, and conversely, in the case of communicating using the network address before the change, a situation of being unable to communicate with a terminal whose network address has changed may occur.

Aspects of non-limiting embodiments of the present disclosure relate to communicating with terminals in a case where the network addresses on a communication channel are changed, even if terminals with changed network addresses and terminals with not-yet-changed network addresses coexist.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device provided with storage and a controller. In a case where a change of network address occurs in a communication channel, the storage stores a pre-change network address for a terminal connected to the communication channel in association with a post-change network address for a terminal whose network address has changed. In a case where communication to a terminal is performed using the pre-change network address, the controller controls the communication by using the storage such that, in a case where the network address of the terminal has not changed, the communication is performed as-is, whereas in a case where the network address of the terminal has changed, the pre-change network address is converted to the post-change network address to communicate with the terminal.

BRIEF DESCRIPTION OF THE DRAWINGS

An exemplary embodiment of the present disclosure will be described in detail based on the following figures, wherein:

FIG. 5 is an explanatory diagram illustrating an exemplary data structure of a MAC-IP management table;

FIG. 9 is an explanatory diagram illustrating an exemplary data structure of a new IP communication management table;

FIG. 12 is an explanatory diagram illustrating an exemplary data structure of a MAC-IP management table;

DETAILED DESCRIPTION

Hereinafter, an exemplary embodiment related to realizing the present disclosure will be described by way of example on the basis of the drawings.

Figure 1:
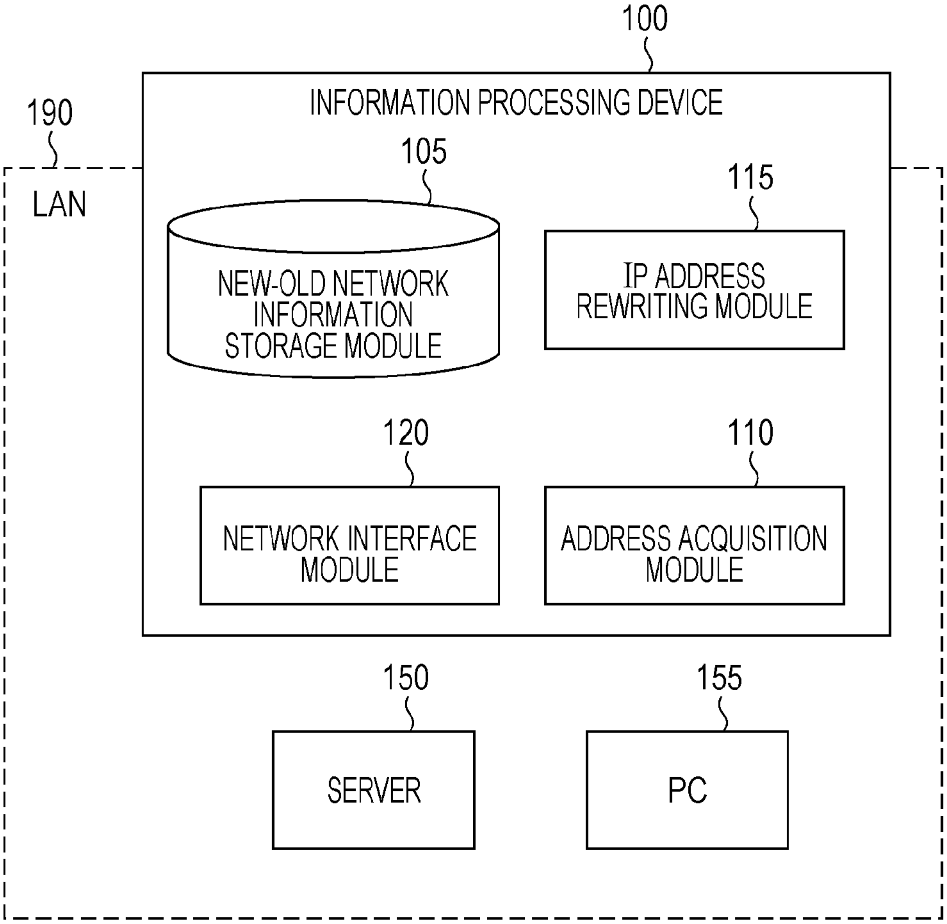
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs are included as an interpretation of "software") and hardware which are typically capable of being logically separated. Consequently, the term module in the exemplary embodiment not only refers to modules in a computer program, but also to modules in a hardware configuration. Therefore, the exemplary embodiment also serves as a description of a computer program (for example, a program that causes a computer to execute each procedure, a program that causes a computer to function as each unit, or a program that causes a computer to realize each function), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with functions on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data, instructions, referential relationships between data, and logins, for example) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, in accordance with conditions or states at that time, or in accordance with conditions or states up to that time. In the case of multiple "predetermined values", the predetermined values may be respectively different values, or two or more values ("two or more values" obviously also includes the case of all values) which are the same. Additionally, statements like "B is performed in the case of A" are used to denote that a determination is made regarding whether or not A holds true, and B is performed in the case where it is determined that A holds true. However, this excludes cases where the determination of whether or not A holds true may be omitted. Also, in the case of listing things, like "A, B, C" and so on, the listing is an illustrative example unless specifically noted otherwise, and includes the case of choosing only one among the listing (for example, A only).

Also, the terms "system" and "device" not only encompass configurations in which multiple computers, pieces of hardware, or devices are connected by a communication medium such as a network (where "network" includes connections that support 1-to-1 communication), but also encompass configurations realized by a single computer, piece of hardware, or device. The terms "device" and "system" are used interchangeably. Obviously, the term "system" does not include merely artificially arranged social constructs (in other words, social systems).

Also, every time a process is performed by each module or every time multiple processes are performed within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk drive, random access memory (RAM), an auxiliary or external storage medium, a storage device accessed through a communication channel, and a register or the like inside a central processing unit (CPU).

As illustrated in the example of FIG. 1, an information processing device 100 according to the exemplary embodiment includes a new-old network information storage module 105, an address acquisition module 110, an IP address rewriting module 115, and a network interface module 120. The information processing device 100 is a device that relays communication, and includes the functions of a network switch such as a gateway or router. Furthermore, the functions of a DHCP server may also be included. The information processing device 100 mediates communication between terminals belonging to a LAN 190, and communication between a terminal belonging to the LAN 190 and a terminal belonging to another LAN. Herein, "terminals belonging to a LAN 190" refers to terminals connected to the LAN 190, and in the example of FIG. 1, refers to a server 150 and a PC 155. These terminals are managed with the same subnet mask (also simply referred to as the subnet). The other LAN may be managed by another information processing device 100 (including a device provided with substantially the same functions as the information processing device 100) or by an existing device such as a router or a DHCP server. Obviously, the LAN 190 and the other LAN have different subnets.

In a case where a change of network address occurs in the communication channel, namely the LAN 190, the new-old network information storage module 105 stores the pre-change network addresses for terminals connected to the LAN 190 in association with the post-change network addresses for terminals whose network address has changed.

Consequently, the new-old network information storage module 105 stores the pre- and post-change network addresses of terminals connected to the LAN 190 even after the change of network address on the LAN 190.

Also, the new-old network information storage module 105 may store, in association with each other, information specifying a terminal, the pre-change network address of the terminal, and the post-change network address of the terminal whose network address has changed. Herein, the "information specifying a terminal" is an identifier for uniquely identifying the terminal in the exemplary embodiment, and may be the MAC address, for example. Specifically, the new-old network information storage module 105 stores the MAC addresses of terminals belonging to the LAN 190, together with the corresponding new and old network addresses.

Furthermore, in the case where another LAN exists, the new-old network information storage module 105 may also store information indicating whether or not communication from the LAN to a new network address is successful. In other words, the case where communication from the other LAN to a new network address is successful indicates that the change of network address in the LAN 190 has already been applied in the "other LAN", and the old network address does not have to be used any more. In other words, it is sufficient for communication to proceed using the new network address. Conversely, the case where communication from the other LAN to a new network address is unsuccessful (but communication to the old network address is successful) indicates that the change of network address in the LAN 190 has not been applied in the "other LAN", and conversion to the old network address may be necessary.

Also, in the case where the network address is changed multiple times, multiple network addresses, such as the second generation (the network address that had been used prior to the current network address) and the third generation (the network address that had been used prior to the second-generation network address), may be stored. Particularly, multiple network addresses may be stored in this way in cases where the network address is changed over short periods.

In the case where communication to a terminal is performed using a pre-change network address, the IP address rewriting module 115 uses the new-old network information storage module 105 to control the communication such that, in the case where the network address of the terminal has not changed, the communication is performed as-is, whereas in the case where the network address of the terminal has changed, the pre-change network address is converted to the post-change network address to communicate with the terminal.

In other words, the IP address rewriting module 115 rewrites the network address used to communicate on the basis of the information in the new-old network information storage module 105, and establishes communication even if the communicating terminals recognize each other differently.

Specifically, it is difficult for the communication source terminal to ascertain in advance whether or not the network address of the communication destination terminal has changed, and communication using the pre-change network address is anticipated. On the other hand, if the subnet of the LAN 190 is changed, in some cases the network address of a destination terminal itself is changed, whereas in other cases the old network address is left unchanged. Accordingly, in the case where the network address of a destination terminal has not changed (in other words, in the case where the old network address is left unchanged), communication is performed using the pre-change network address. On the other hand, in the case where the network address of a destination terminal has changed (in other words, in the case where the network address is changed to the new network address), communication to the terminal is performed by converting the pre-change network address to the post-change network address.

Also, in the case where there is communication from a first terminal whose network address has changed to a second terminal connected to a second LAN to which the change of network address on the LAN 190 has not been applied, the IP address rewriting module 115 may control the communication such that the network address of the first terminal is converted to the pre-change network address.

Herein, the "second LAN" refers to a LAN different from the LAN 190 on which the change of network address occurred. Specifically, the "second LAN" is a LAN with a different subnet mask.

Furthermore, in the case where there is communication from the second terminal to the pre-change network address of the first terminal, the IP address rewriting module 115 may control the communication such that the network address of the first terminal is converted to the post-change network address.

Additionally, the IP address rewriting module 115 may cause a notification about applying a change of network address to be issued to the second terminal that is using the pre-change network address to communicate with the first terminal whose network address has changed. The receiver of the notification is the second terminal.

Furthermore, in the case where the elapsed time since the change of network address occurred in the first terminal or the number of second terminals satisfies a predetermined condition, the IP address rewriting module 115 may cause a notification about applying a change of network address to be issued.

Herein, the "predetermined condition" may include the following conditions.

(1) The elapsed time since the change of network address occurred in the first terminal is longer than, or at least equal to, a predetermined period. Obviously, the information processing device 100 manages the dates and times when changes of network address occur in the first terminals.

(2) The number of second terminals is less than, or at most equal to, a predetermined number. Obviously, the information processing device 100 manages the number of second terminals.

Also, the notification may be issued as follows.

(1) In the case where the communication using the pre-change network address is HTTP communication, embed a notification about changing the bookmark address into the HTTP content transmitted in response.

(2) In the case where the communication using the pre-change network address is the transmission or reception of email, send a notification indicating that the network address has changed to the email address of the communication source.

(3) Send an email notification containing a list of terminals using old network addresses to the email address of an administrator, or display the list on a user interface (UI) screen.

The address acquisition module 110 stores the pre-change network addresses for terminals connected to the LAN 190 to be changed in the new-old network information storage module 105.

Additionally, in the case where a change of network address occurs on the LAN 190, the address acquisition module 110 may detect each terminal whose network address has changed, associate the post-change network address of the terminal with the pre-change network address of the terminal, and store the associated network addresses in the new-old network information storage module 105.

In other words, the address acquisition module 110 acquires the network addresses of the terminals belonging to the LAN 190. For example, the address acquisition module 110 examines the current combinations of the MAC addresses and the network addresses of terminals belonging to the LAN 190 to update the new-old network information storage module 105. If a previous network address and a current network address are different for a terminal with the same MAC address, the combination of the old network address and the new network address may be generated.

Specifically, the address acquisition module 110 acquires a MAC address and network address pair by a process according to the flowchart illustrated in the example of FIG. 14 described later.

The network interface module 120 is an interface capable of retaining the pre-change network address and the post-change network address. In other words, the information processing device 100 has two network addresses.

The server 150 and the PC 155 are examples of terminals belonging to the LAN 190. Obviously, other terminals capable of communication, such as a multi-function device (an image processing device having two or more from among scanning, printing, copying, and faxing functions or the like) and a mobile information terminal, may also belong to the LAN 190.

Figure 2:
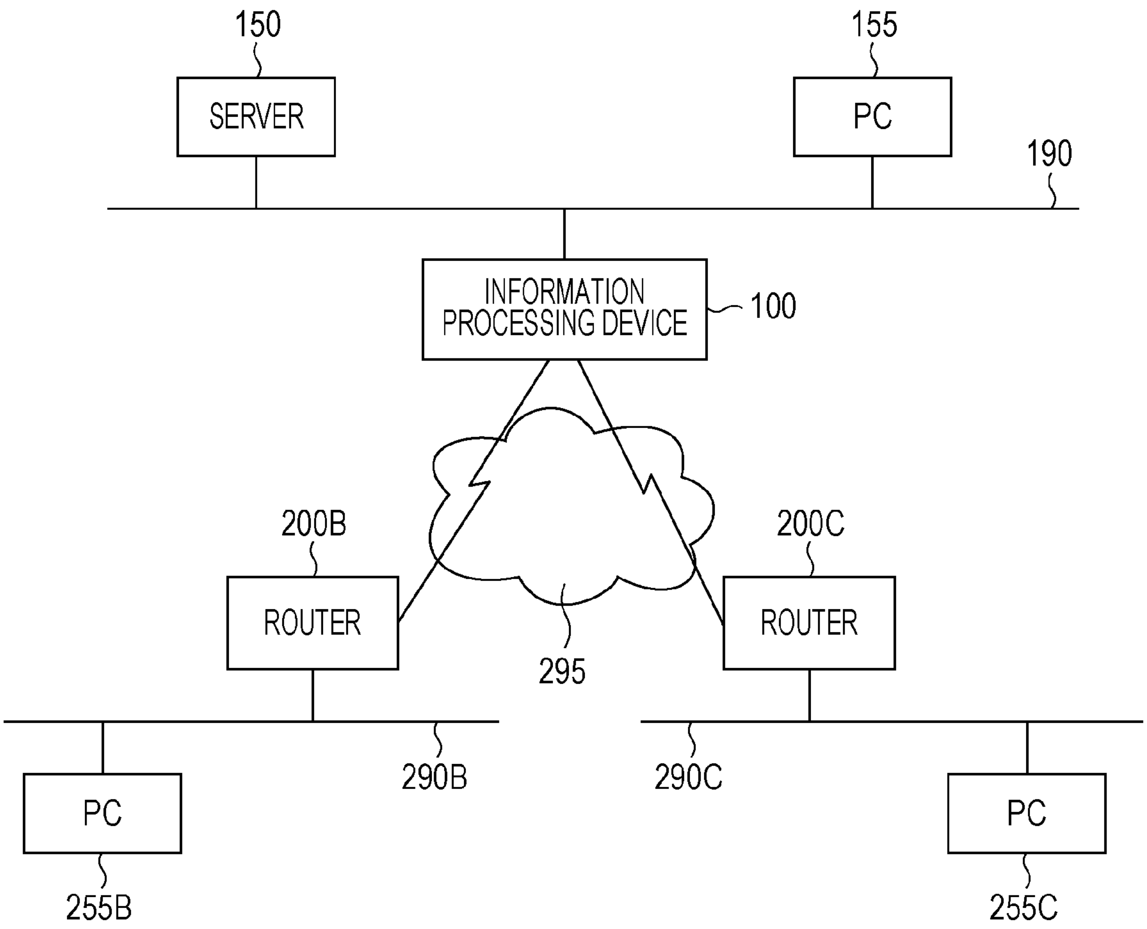
FIG. 2 is an explanatory diagram illustrating an exemplary system configuration utilizing the exemplary embodiment.

FIG. 2 is an explanatory diagram illustrating an exemplary system configuration utilizing the exemplary embodiment. IP addresses are used as an example of the network addresses.

The information processing device 100, the server 150, and the PC 155 are interconnected through the LAN 190. A router 200B and a PC 255B are connected through a LAN 290B. A router 200C and a PC 255C are connected through a LAN 290C. The information processing device 100, the router 200B, and the router 200C are connected through a communication channel 295. The LAN 190 and the LAN 290 may be wireless, wired, or a combination of the two, and each may be an intranet or the like used as a communication infrastructure, for example. For example, the communication channel 295 may be called a virtual private network (VPN) supporting LAN, may be wireless, wired, or a combination of the two, and may be the Internet, an intranet, or the like used as a communication infrastructure, for example.

As network infrastructure and departments are consolidated or abolished, the work of changing internal company network addresses occurs frequently.

However, changing network addresses may involve work such as changing settings (such as bookmarks and an email server, for example) on the individual PC of each user in some cases, which is burdensome for the administrator.

In other cases, such as for IoT devices, a change of network address is not applied immediately, and IP addresses are not updated until the settings are updated or the device is rebooted.

As another example, in the case of an environment in which multiple networks are connected through a VPN or the like as illustrated in FIG. 2, periods during which a target server is unavailable for communication may occur unless settings are changed at the same time in physically distant network environments.

Even in cases where a change of settings may be necessary at some timing in each terminal or each hub (specifically, in the example illustrated in FIG. 2, terminals such as the server 150, the PC 155, the router 200, and the PC 255) as part of a change of network address, there is a desire to perform the changeover work without causing an interruption in communication.

The information processing device 100 according to the exemplary embodiment makes it possible to perform communication smoothly by storing the new and the old network addresses in association with each other. Furthermore, device-specific identification information (for example, the MAC address) may also be stored in association with the new and the old network addresses.

The information processing device 100 performs processes like the following. Note that this description is for the purpose of making the exemplary embodiment easy to understand, and is not intended to be used in a limited interpretation of the exemplary embodiment.

The information processing device 100 stores in advance the old IP addresses of terminals connected to the LAN 190 targeted for a change of network address.

After the change of network address, the terminals that have switched to a new network address are ascertained.

After the change of network address, the pre-change network addresses are kept in the network interface module 120. In other words, both the pre-change and the post-change network addresses are usable.

In the case of a communication request from a certain terminal to an old IP address, the following process is performed.

If the terminal of the communication destination is a terminal still retaining the old IP address, communication is performed as-is.

If the terminal of the communication destination is a terminal that has switched to the new IP address, communication is performed by rewriting the new IP address over the old IP address.

It is also ascertained whether the change of network address on the LAN 190 has been applied on other LAN(s) 290.

When communicating with the other LAN(s) 290, by appropriately rewriting the IP address according to whether the new or the old IP address is being used, communication is maintained even if there is a difference in the state of the change of settings.

For example, in the case of a communication request from a terminal of the new IP address to a terminal on another LAN 290 that has not applied the change of settings, communication is performed by rewriting the IP address of the source with the old IP address.

Terminals that satisfy a predetermined condition, such as terminals using the old IP address for a long period of time, are notified to change settings.

By causing these processes to be performed inside the information processing device 100 acting as a gateway, the workload on the administrator is reduced.

Figure 3:
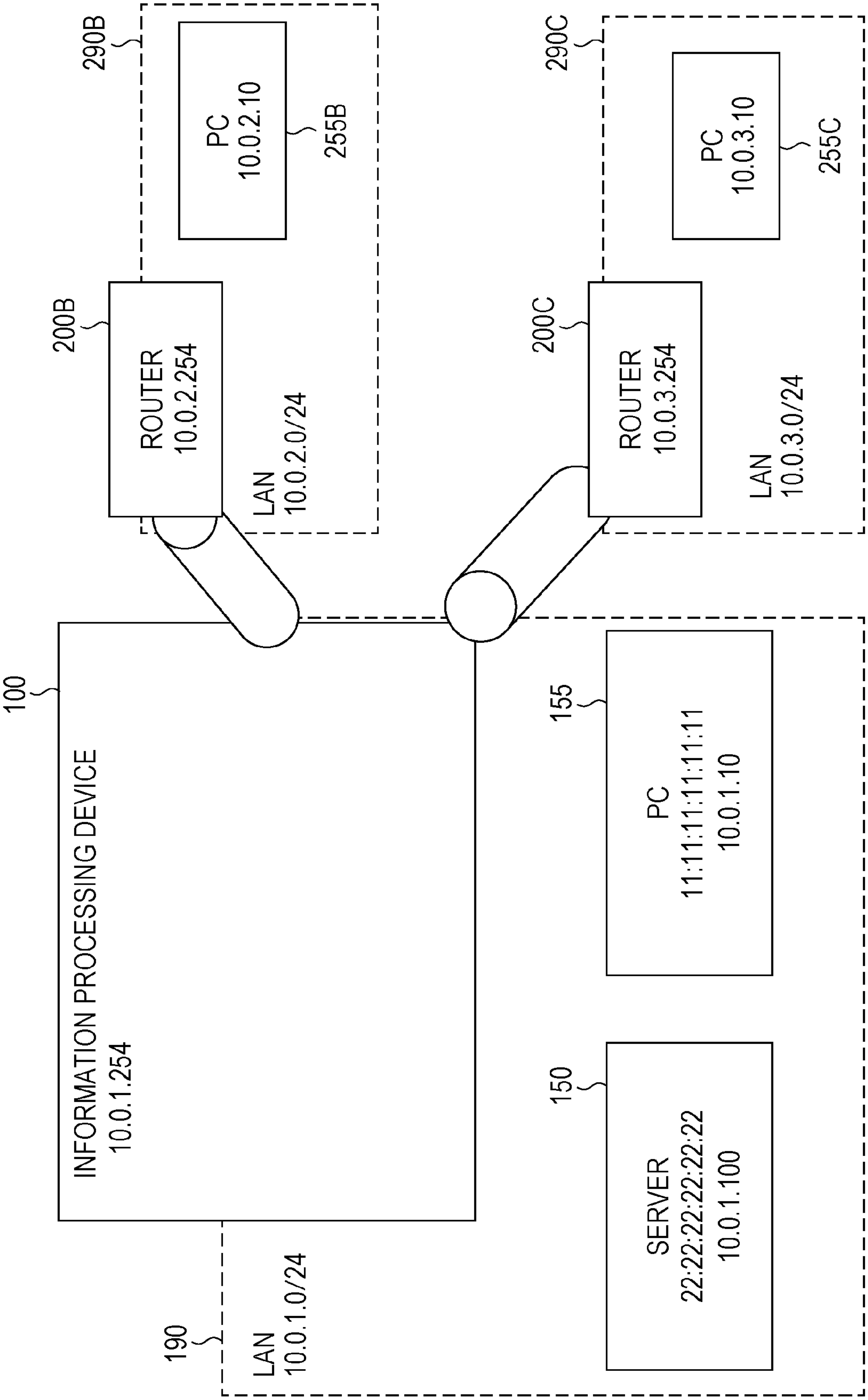
FIG. 3 is an explanatory diagram illustrating an example process according to the exemplary embodiment.

FIG. 3 is an explanatory diagram illustrating an exemplary process according to the exemplary embodiment. The example of FIG. 3 illustrates a state before a change of IP address.

A VPN connection is formed between the LAN 190 and the LAN 290B, and also between the LAN 190 and the LAN 290C. Specifically, a VPN connection is formed between the information processing device 100 and the router 200B, and also between the information processing device 100 and the router 200C. For communication between a terminal belonging to the LAN 190 and a terminal belonging to the LAN 290B or the LAN 290C, the information processing device 100 relays the communication. Also, even in the case where terminals belonging to the LAN 190, namely the server 150 and the PC 155, communicate with each other, the information processing device 100 relays the communication.

The IP address of the information processing device 100 is "10.0.1.254".

The MAC address of the server 150 is "22:22:22:22:22:22", and the IP address is "10.0.1.100".

The MAC address of the server 150 is "11:11:11:11:11:11", and the IP address is "10.0.1.10".

The IP address of the LAN 190 is "10.0.1.0/24" (subnet).

The IP address of the router 200B is "10.0.2.254". The IP address of the PC 255B is "10.0.2.10". The IP address of the LAN 290B is "10.0.2.0/24" (subnet).

The IP address of the router 200C is "10.0.3.254". The IP address of the PC 255C is "10.0.3.10". The IP address of the LAN 290C is "10.0.3.0/24" (subnet).

Figure 4:
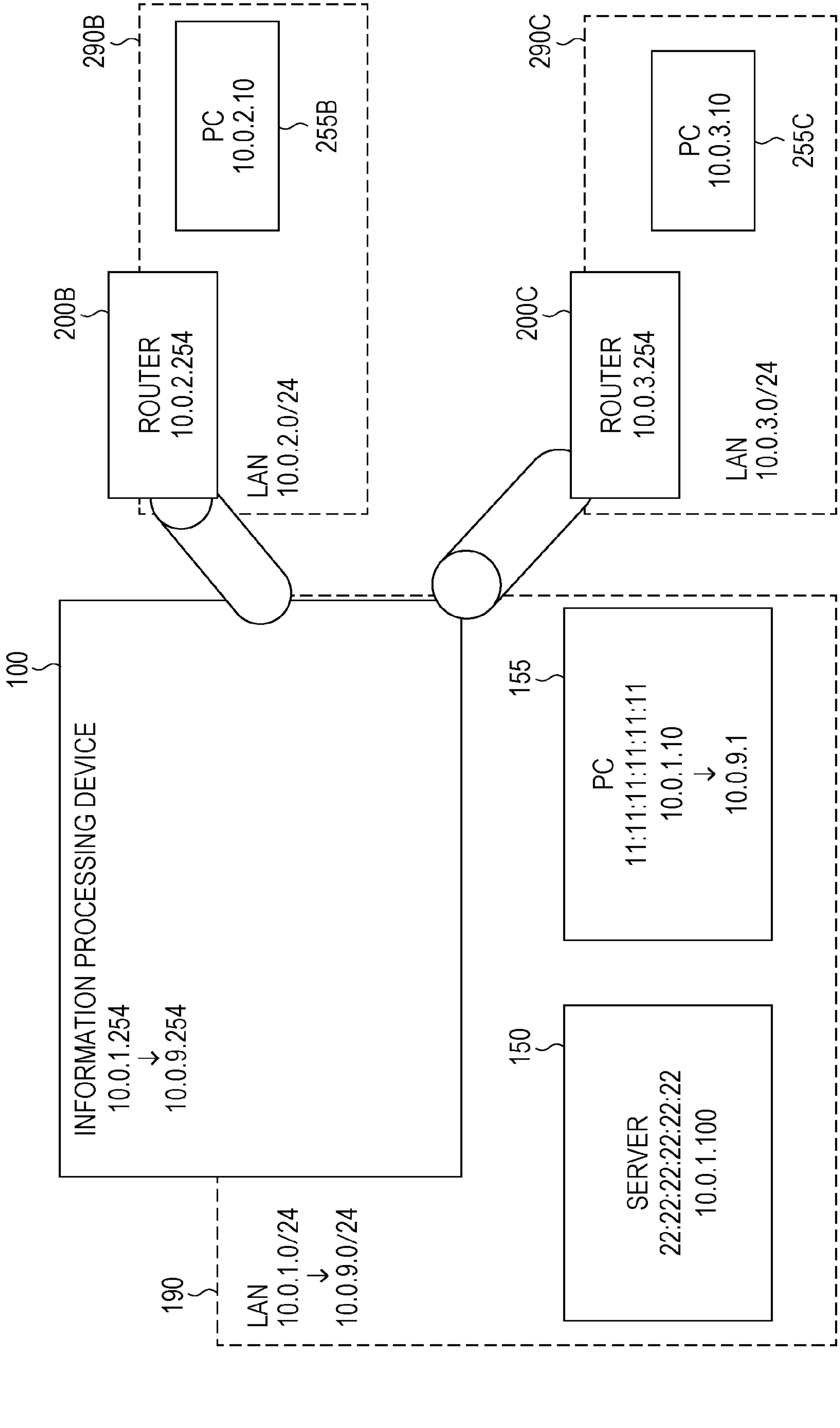
FIG. 4 is an explanatory diagram illustrating an example process according to the exemplary embodiment.

FIG. 4 is an explanatory diagram illustrating an exemplary process according to the exemplary embodiment. The example of FIG. 4 illustrates a state after a change of IP address, in which the IP address of the PC 155 has changed.

The IP address is changed by the information processing device 100. Specifically, IP addresses on the LAN 190 change from "10.0.1.0/24" (subnet) to "10.0.9.0/24" (subnet), and the information processing device 100 has the two IP addresses "10.0.1.254" and "10.0.9.254". Note that FIGS. 6, 7, 8, 10, 11, and 13 likewise illustrate states after IP addresses on the LAN 190 are changed.

The PC 155 is rebooted and reacquires DHCP from the information processing device 100, and the IP address of the PC 155 is changed from "10.0.1.10" to "10.0.9.1".

In this state, the information processing device 100 generates a MAC-IP management table 500 for example. FIG. 5 is an explanatory diagram illustrating an exemplary data structure of the MAC-IP management table 500. The MAC-IP management table 500 includes a MAC field 510, an old IP field 520, and a new IP field 530. The MAC field 510 stores the MAC address. The old IP field 520 stores the old IP address. The new IP field 530 stores the new IP address.

For example, the first row of the MAC-IP management table 500 indicates that the PC 155 with the MAC address "11:11:11:11:11:11" has the old IP address "10.0.1.10" and the new IP address "10.0.9.1", while the second row indicates that the server 150 with the MAC address "22:22:22:22:22:22" has the old IP address "10.0.1.100" and the new IP address is not set.

Figure 6:
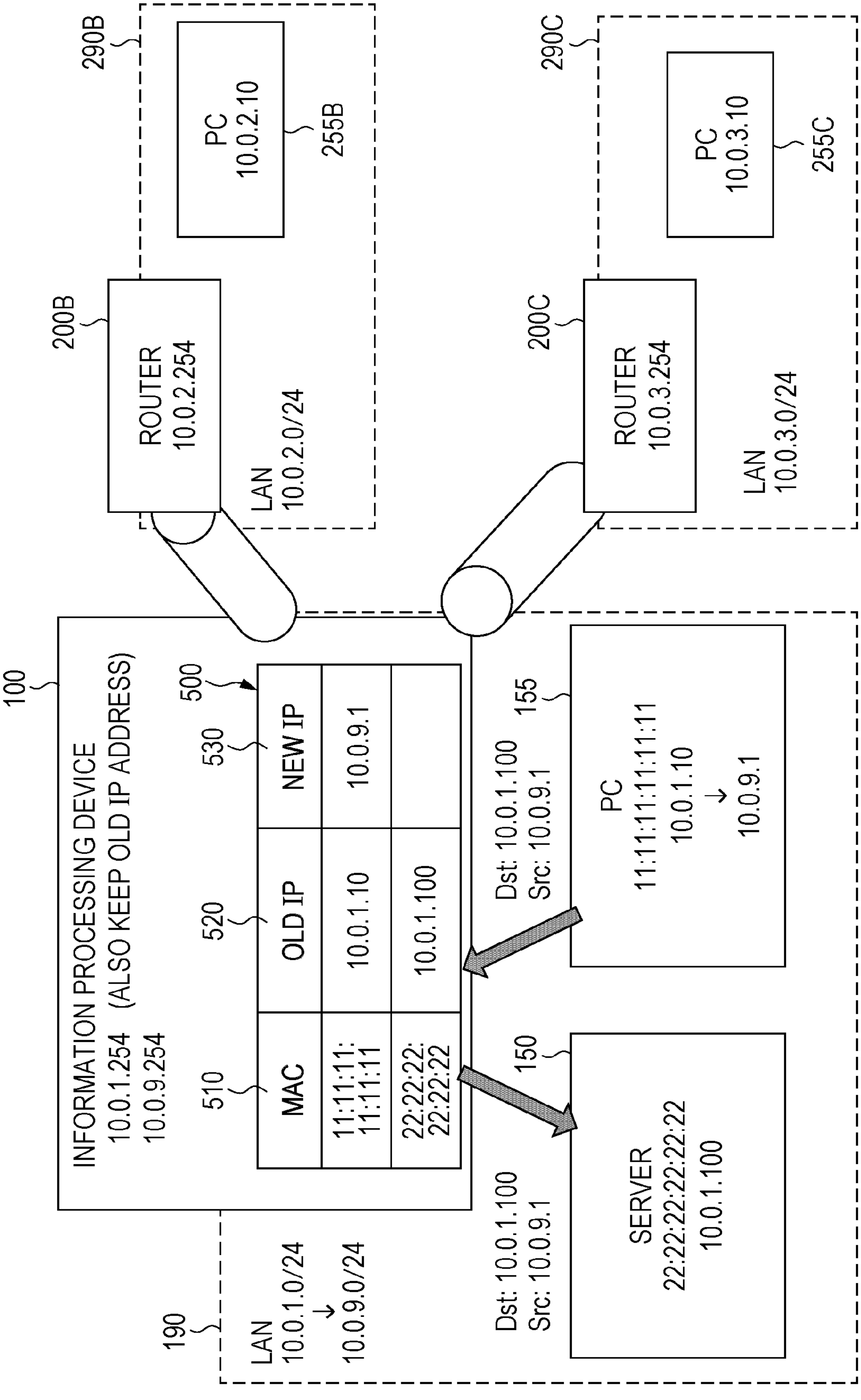
FIG. 6 is an explanatory diagram illustrating an example process according to the exemplary embodiment.

FIG. 6 is an explanatory diagram illustrating an exemplary process according to the exemplary embodiment. The example of FIG. 6 illustrates an example of communication from the PC 155 to the server 150.

Ordinarily, communication becomes unavailable when a network changes, but the information processing device 100 that acts as a gateway enables communication by resolving and forwarding the new and old IP addresses.

Specifically, in the case of transmitting from the PC 155 to the server 150, "Dst (destination IP address): 10.0.1.100, Src (source IP address): 10.0.9.1" is set from the PC 155 to the information processing device 100, and "Dst: 10.0.1.100, Src: 10.0.9.1" is set from the information processing device 100 to the server 150. From the MAC-IP management table 500, it is determined that the destination, namely the server 150, has not changed its network address. Consequently, communication is performed without changing the destination IP address or the source IP address. In other words, this example is one example of "in the case where there is communication to a terminal using a pre-change network address, using the MAC-IP management table 500 to control the communication such that, in the case where the network address of the terminal has not changed, the communication is performed as-is".

Figure 7:
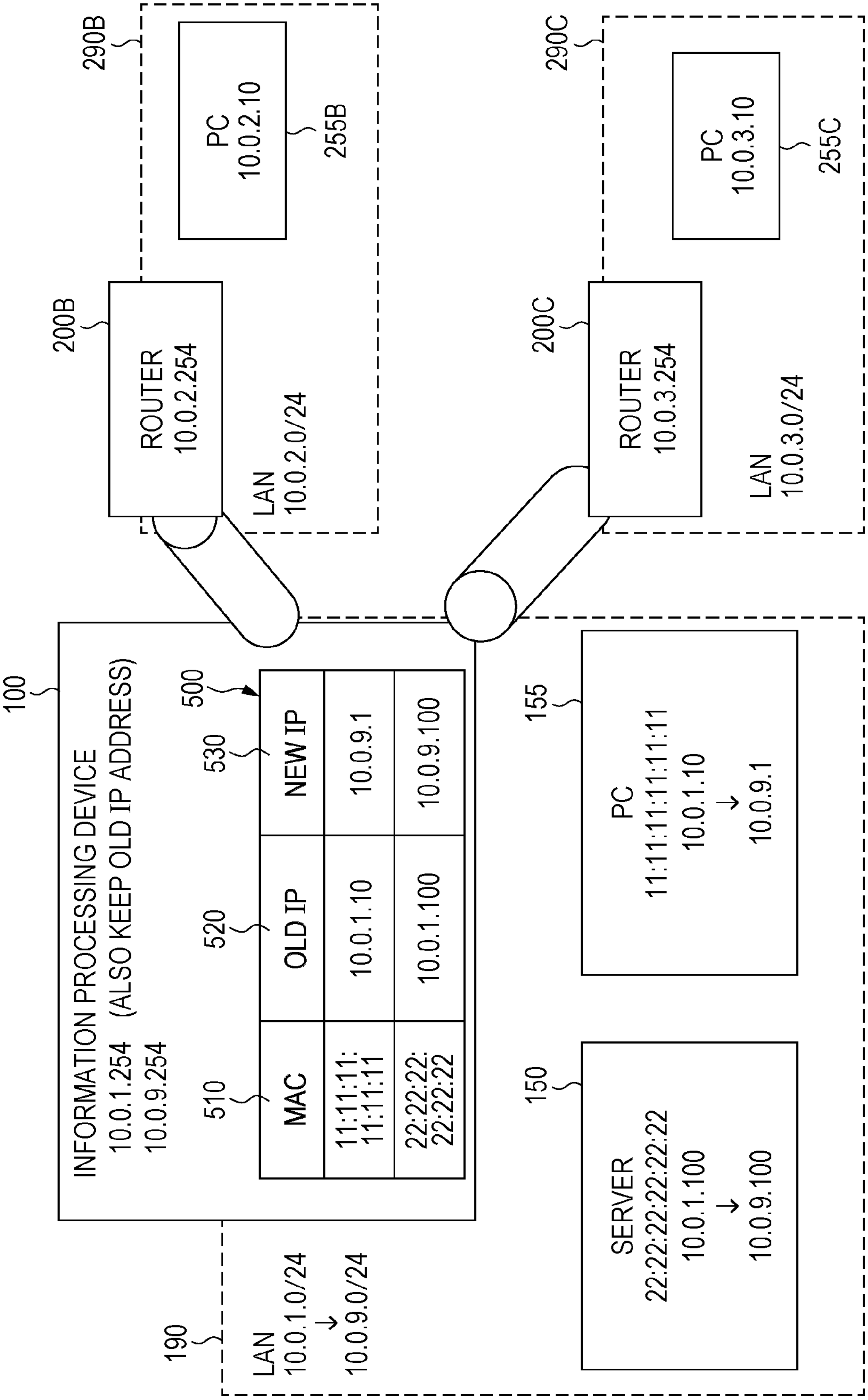
FIG. 7 is an explanatory diagram illustrating an example process according to the exemplary embodiment.

FIG. 7 is an explanatory diagram illustrating an exemplary process according to the exemplary embodiment.

By having the server 150 also reacquire DHCP from the information processing device 100, the IP address of the server 150 is changed from "10.0.1.100" to "10.0.9.100".

In this state, the information processing device 100 rewrites the MAC-IP management table 500. Specifically, the second row of the new IP field 530 of the MAC-IP management table 500 is rewritten from blank to "10.0.9.100".

Figure 8:
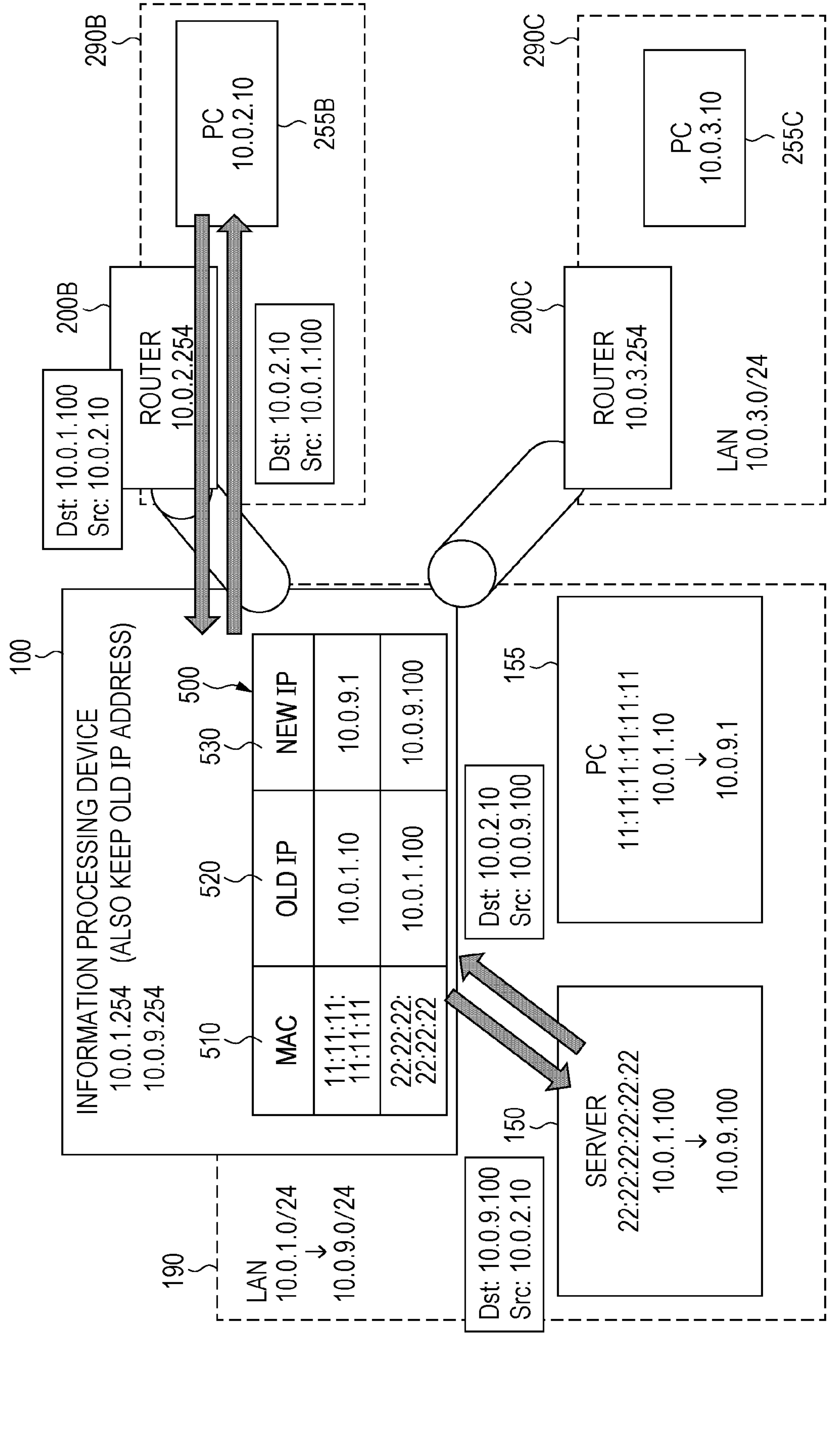
FIG. 8 is an explanatory diagram illustrating an example process according to the exemplary embodiment.

FIG. 8 is an explanatory diagram illustrating an exemplary process according to the exemplary embodiment. In the example of FIG. 8, communication between the PC 255B belonging to the LAN 290B and the server 150 belonging to the LAN 190 will be described.

In this example, the PC 255B has not ascertained the change of network address in the LAN 190 or the server 150, and therefore the PC 255B attempts communication addressed to the old IP address of the server 150.

In other words, communication is performed in which "Dst: 10.0.1.100, Src: 10.0.2.10" is set from the PC 255B to the information processing device 100, and "Dst: 10.0.9.100, Src: 10.0.2.10" is set from the information processing device 100 to the server 150. At this point, the MAC-IP management table 500 is used to enable communication by rewriting Dst from the old IP address to the new IP address.

Subsequently, as a reply, communication is performed in which "Dst: 10.0.2.10, Src: 10.0.9.100" is set from the server 150 to the information processing device 100, and "Dst: 10.0.2.10, Src: 10.0.1.100" is set from the information processing device 100 to the PC 255B. At this point, the MAC-IP management table 500 is used to rewrite Src from the new IP address to the old IP address and guarantee a reply from the same "10.0.1.100" as the destination.

FIG. 9 is an explanatory diagram illustrating an exemplary data structure of a new IP communication management table 900. The new IP communication management table 900 is stored by the new-old network information storage module 105, and in the case where there is communication with another LAN after IP addresses are changed by the information processing device 100, the new IP communication management table 900 manages whether or not the post-change IP addresses have been used. Note that the information processing device 100 uses the new IP communication management table 900 in the case of communicating from a terminal belonging to the LAN 190 to a terminal belonging to the other LAN(s) 290, but does not have to use the new IP communication management table 900 in the case of communicating from a terminal belonging to the other LAN(s) 290 to a terminal belonging to the LAN 190 as illustrated in the example of FIG. 8.

The new IP communication management table 900 includes a LAN field 910 and a communication-to-new-IP field 920. The LAN field 910 stores the LAN. The communication-to-new-IP field 920 stores information about whether or not there is communication to the new IP addresses.

For example, the first row of the new IP communication management table 900 indicates that the LAN "10.0.2.0/24" has not communicated ("N") to the new IP addresses, while the second row indicates that the LAN "10.0.3.0/24" has communicated ("Y") to the new IP addresses.

Figure 10:
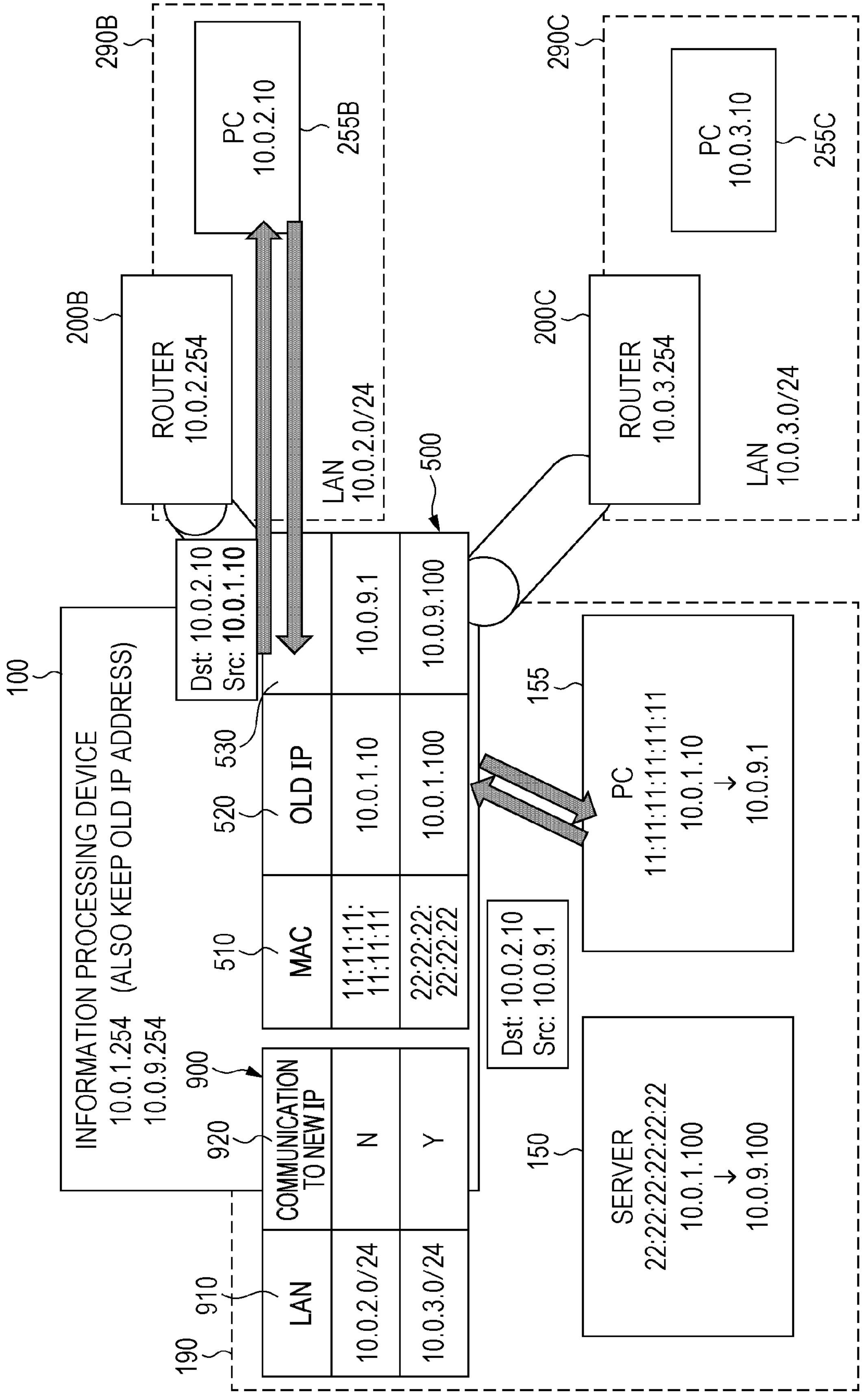
FIG. 10 is an explanatory diagram illustrating an example process according to the exemplary embodiment.

FIG. 10 is an explanatory diagram illustrating an example process according to the exemplary embodiment. The example of FIG. 10 illustrates an example of communication from the PC 155 to the PC 255B using the new IP communication management table 900. In the case where a change of IP address (net mask) on the LAN 190 has not been applied to the router 200B of the LAN 290B, a communication route to "10.0.9.0/24" of the LAN 190 is not set, and therefore communication would be unavailable in typical circumstances (that is, in circumstances where the exemplary embodiment is not used).

When communicating from the PC 155 to the PC 255B, communication is enabled by rewriting Src from the new IP address to the old IP address. Specifically, communication is performed in which "Dst: 10.0.2.10, Src: 10.0.9.1" is set from the PC 155 to the information processing device 100, and "Dst: 10.0.2.10, Src: 10.0.1.10" is set from the information processing device 100 to the PC 255B. At this point, according to the new IP communication management table 900, there has been no communication ("N") from a terminal belonging to the LAN 290B to the new IP address, and therefore it is determined that the change of IP address (net mask) on the LAN 190 has not been applied to the LAN 290B. Accordingly, the MAC-IP management table 500 is used to enable communication by rewriting Src from the new IP address to the old IP address.

Additionally, as a reply from the PC 255B to the PC 155, communication is performed in which "Dst: 10.0.1.10, Src: 10.0.2.10" is set from the PC 255B to the information processing device 100, and "Dst: 10.0.9.1, Src: 10.0.2.10" is set from the information processing device 100 to the PC 155. At this point, the MAC-IP management table 500 is used to enable communication by rewriting Dst from the old IP address to the new IP address.

Figure 11:
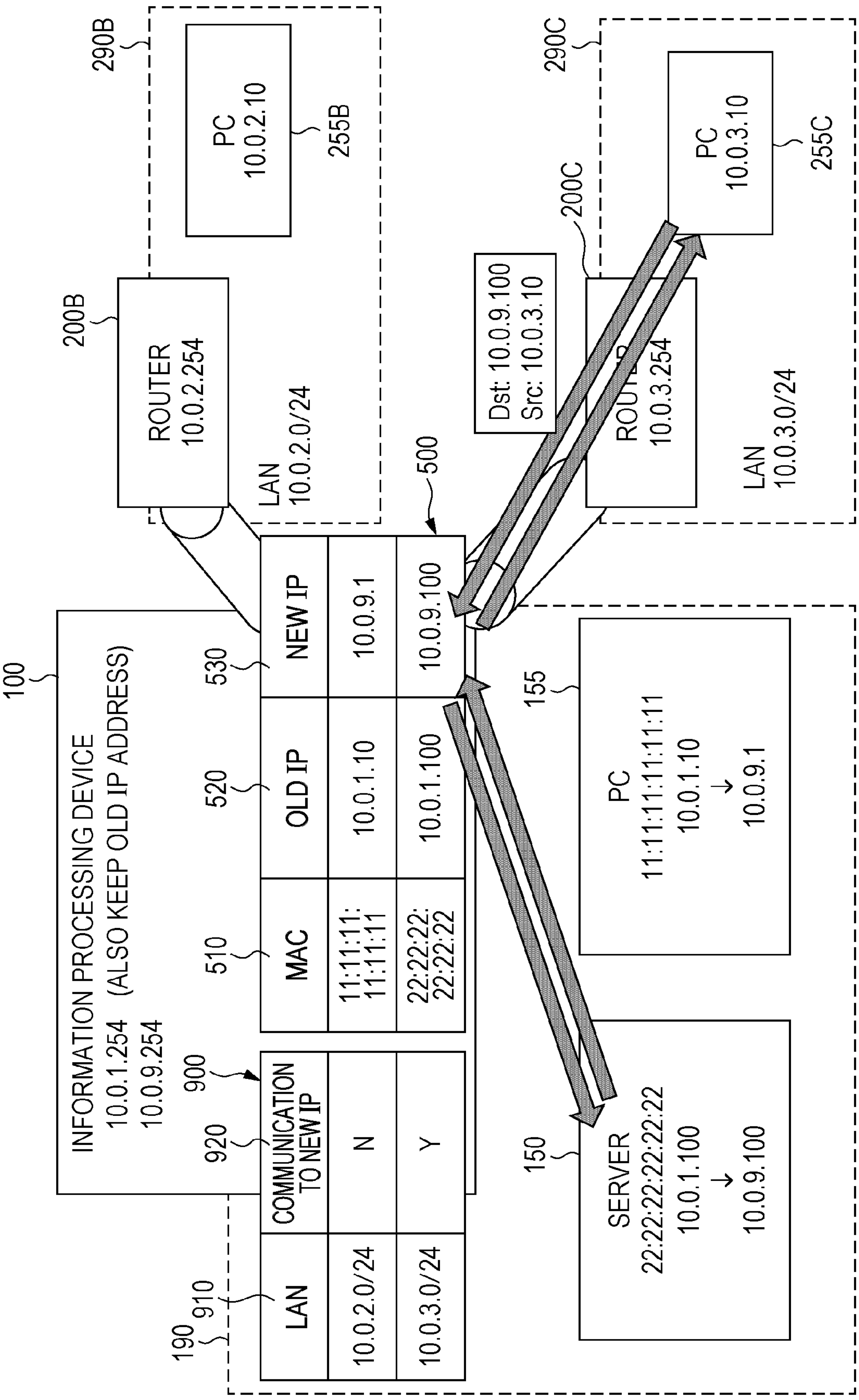
FIG. 11 is an explanatory diagram illustrating an example process according to the exemplary embodiment.

FIG. 11 is an explanatory diagram illustrating an example process according to the exemplary embodiment. The example of FIG. 11 illustrates that communication as expected is possible in an environment in which the settings for a change of IP address (net mask) have been applied smoothly between two LANs.

In the case where a change of IP address (net mask) on the LAN 190 has been applied to the router 200C of the LAN 290C, a communication route to "10.0.9.0/24" of the LAN 190 is set, and therefore communication is also available in the case of using the exemplary embodiment.

An example of communication between the PC 255C and the server 150 is illustrated.

Communication is performed in which "Dst: 10.0.9.100, Src: 10.0.3.10" is set from the PC 255C belonging to the LAN 290C to the information processing device 100, and "Dst: 10.0.9.100, Src: 10.0.3.10" is set from the information processing device 100 to the server 150. At this point, according to the new IP communication management table 900, there has been communication ("Y") from a terminal belonging to the LAN 290C to the new IP address, and therefore it is determined that the change of IP address (net mask) on the LAN 190 has been applied to the LAN 290C, and communication is performed as-is without a change of IP address.

Subsequently, as a reply in a similar manner, communication is performed in which "Dst: 10.0.3.10, Src: 10.0.9.100" is set from the server 150 to the information processing device 100, and "Dst: 10.0.3.10, Src: 10.0.9.100" is set from the information processing device 100 to the PC 255C. At this point, because Src is determined to be the new IP address from the MAC-IP management table 500, communication is performed as-is without a change of IP address.

To control the issuing of a notification about applying a change of network address to a second terminal that is using the pre-change network address to communicate with a first terminal whose network address has changed, a MAC-IP management table 1200 is used, for example.

FIG. 12 is an explanatory diagram illustrating an exemplary data structure of the MAC-IP management table 1200. The MAC-IP management table 1200 is the MAC-IP management table 500 with the addition of a last date/time IP used field 1240 and an old IP-using list field 1250. The MAC-IP management table 1200 includes a MAC field 1210, an old IP field 1220, a new IP field 1230, the last date/time IP used field 1240, and the old IP-using list field 1250. The MAC field 1210 stores the MAC address. The old IP field 1220 stores the old IP address. The new IP field 1230 stores the new IP address. The last date/time IP used field 1240 stores the last date/time (the time may be the year, month, day, hour, minute, second, fraction of a second, or some combination thereof) when the old IP address was used. The old IP-using list field 1250 stores a list of terminals communicating by using the old IP address. Herein, a list of the IP address of such terminal(s) is given as an example.

Figure 13:
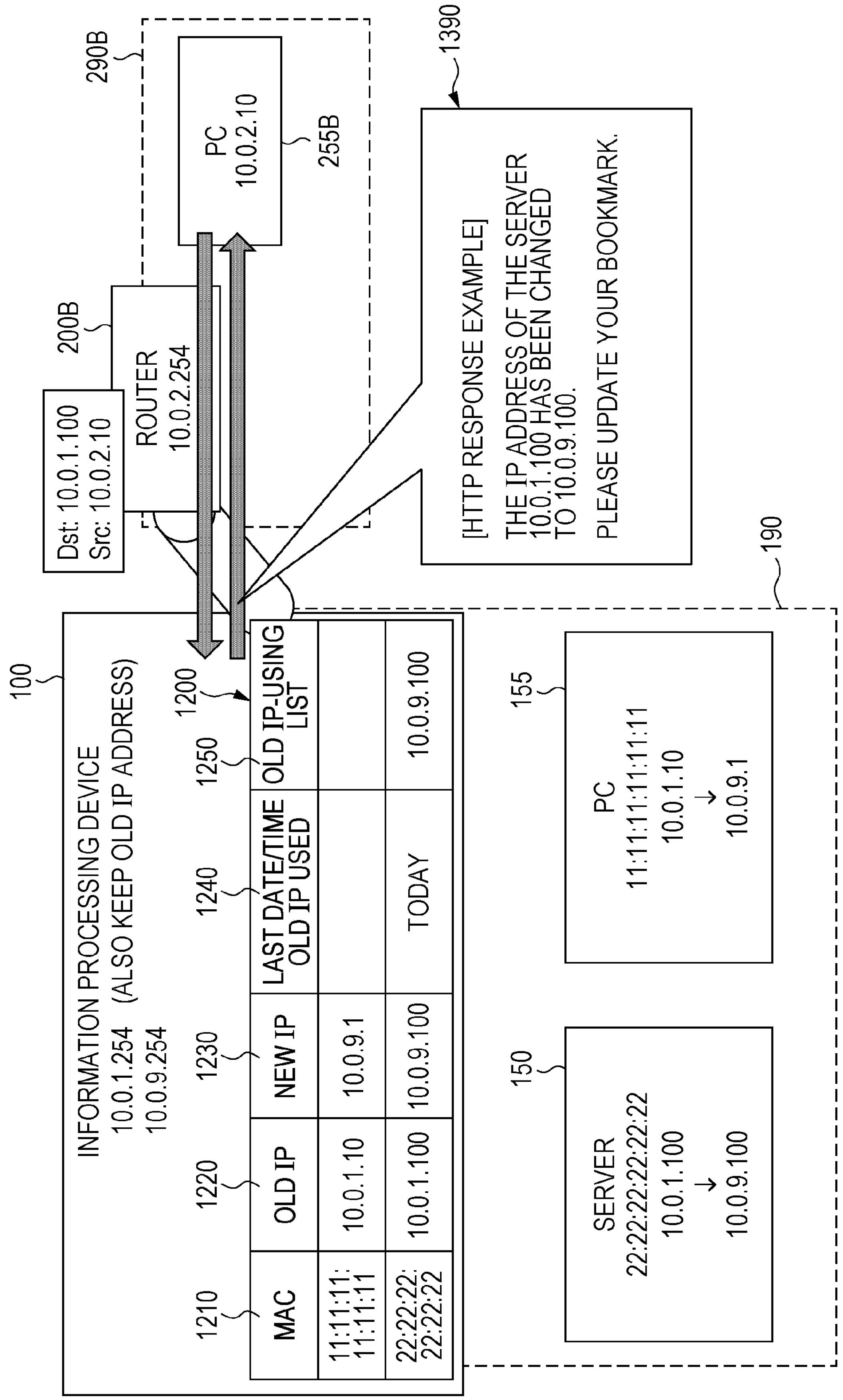
FIG. 13 is an explanatory diagram illustrating an example process according to the exemplary embodiment.

FIG. 13 is an explanatory diagram illustrating an example process according to the exemplary embodiment. The example of FIG. 13 illustrates an example of causing a notification about applying a change of network address to be issued to the PC 255B that is using the pre-change network address to communicate with the server 150 whose network address has changed.

For example, assume that a predetermined period has elapsed since the server 150 changed its IP address from "10.0.1.100" to "10.0.9.100". However, in the case where there is HTTP access using the old IP address "10.0.1.100" from the PC 255B belonging to the LAN 290B, the information processing device 100 notifies the PC 255B with an HTTP response 1390. The HTTP response 1390 causes an error page stating, for example, "The IP address of the server 10.0.1.100 has been changed to 10.0.9.100. Please update your bookmark." to be displayed in a web browser of the PC 255B. In this way, the user of the PC 255B is requested to apply the IP address change without requiring work by the administrator to instruct users to make the change.

Note that, as a specific process, in the case where communication using the old IP address "10.0.1.100" from the PC 255B occurs, the date and time when the communication occurs is stored in the last date/time IP used field 1240 and the IP address of the PC 255B is stored in the list using old IP field 1250 of the MAC-IP management table 1200. Additionally, in the case of determining that a predetermined period has elapsed since the server 150 changed to the new IP address, the PC 255B is notified with the HTTP response 1390.

Figure 14:
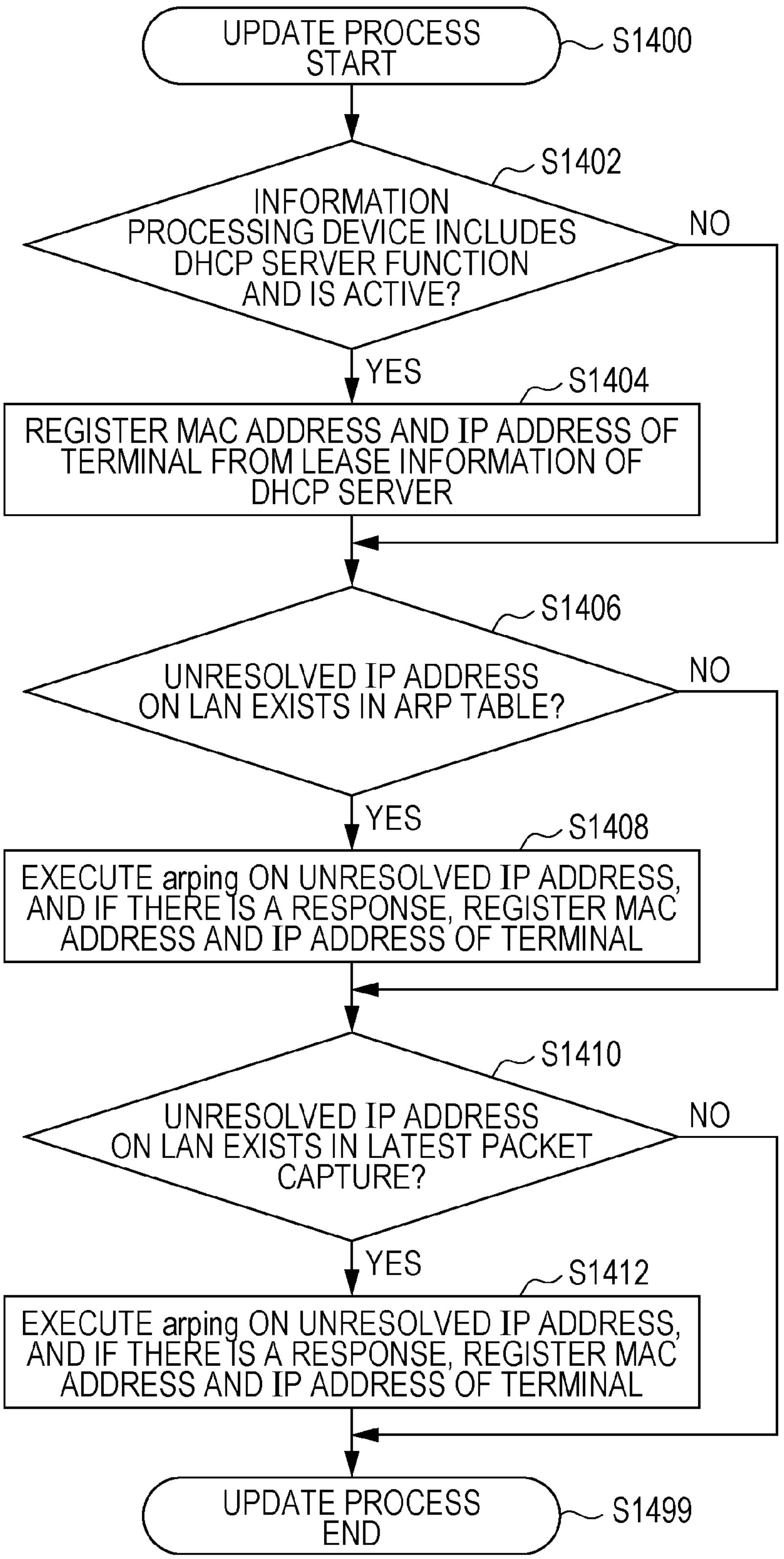
FIG. 14 is a flowchart illustrating an exemplary process according to the exemplary embodiment.

FIG. 14 is a flowchart illustrating an exemplary process according to the exemplary embodiment. FIG. 14 illustrates an exemplary process by the address acquisition module 110, and illustrates an exemplary process of acquiring the MAC address and network address pair of a terminal. Specifically, FIG. 14 illustrates an exemplary process of registering the MAC address and network address pair of a terminal in the MAC-IP management table 500 or the MAC-IP management table 1200. Note that the registrations in step S1404, step S1408, and step S1412 are registrations in the MAC-IP management table 500 or the MAC-IP management table 1200.

In step S1400, the update process starts.

In step S1402, it is determined whether or not the information processing device 100 includes DHCP server functions and also whether or not the DHCP server functions are active. If the DHCP server functions are included and active, the flow proceeds to step S1404, otherwise the flow proceeds to step S1406.

In step S1404, the MAC address and IP address of a terminal are registered from the lease information of the DHCP server.

In step S1406, it is determined whether or not an unresolved IP address inside a LAN exists in an ARP table, and if so, the flow proceeds to step S1408, otherwise the flow proceeds to step S1410.

In step S1408, arping is executed on the unresolved IP address, and if there is a response, the MAC address and IP address of the terminal are registered.

In step S1410, it is determined whether or not an unresolved IP address inside a LAN exists in the latest packet capture, and if so, the flow proceeds to step S1412, otherwise the process ends (step S1499).

In step S1412, arping is executed on the unresolved IP address, and if there is a response, the MAC address and IP address of the terminal are registered.

In step S1499, the update process ends.

Figure 15:
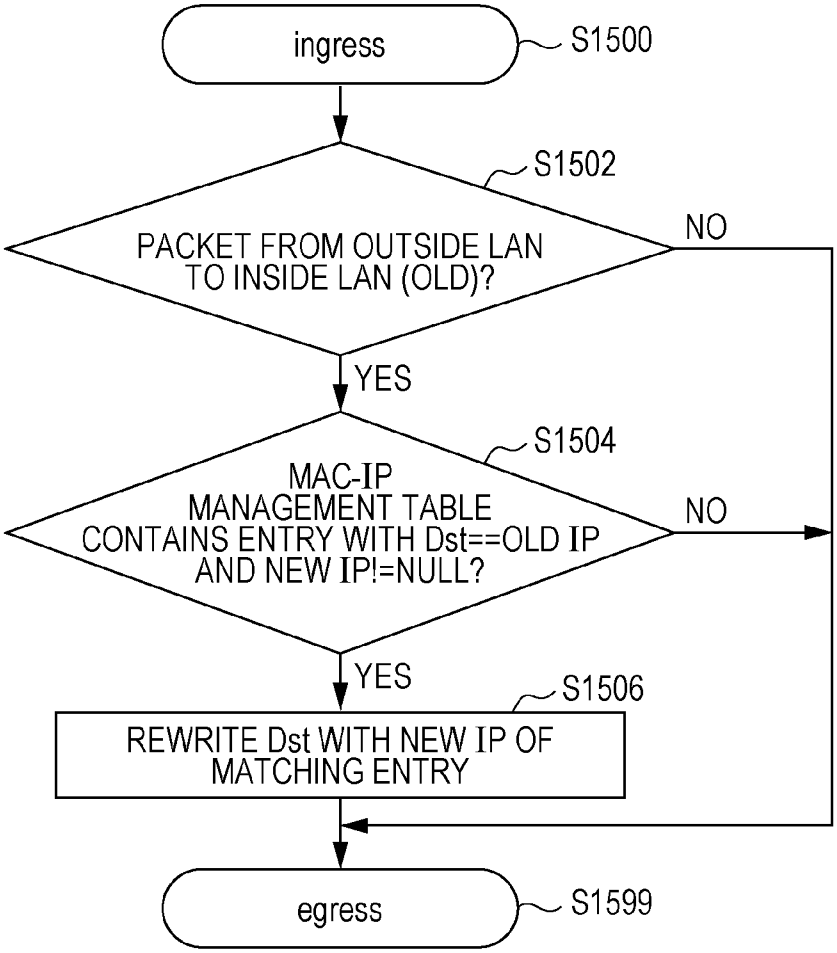
FIG. 15 is a flowchart illustrating an exemplary process according to the exemplary embodiment.

FIG. 15 is a flowchart illustrating an exemplary process according to the exemplary embodiment. FIG. 15 illustrates an exemplary process by the IP address rewriting module 115, and illustrates an exemplary process of packet communication from a terminal outside a LAN to a terminal inside the LAN.

In step S1502, it is determined whether or not a packet transmission from a terminal outside the LAN to a terminal inside the LAN (old IP address) exists, and in the case where a packet transmission from a terminal outside the LAN to a terminal inside the LAN (old IP address) exists, the flow proceeds to step S1504, otherwise the process ends (step S1599).

In step S1504, it is determined whether or not an entry satisfying "Dst is old IP address" and "New IP is not blank (NULL)" exists in the MAC-IP management table 500, and if so, the flow proceeds to step S1506, otherwise the process ends (step S1599).

In step S1506, Dst is rewritten to the new IP address of the matching entry.

Note that a rewrite of the Src of the return packet is omitted.

Figure 16:
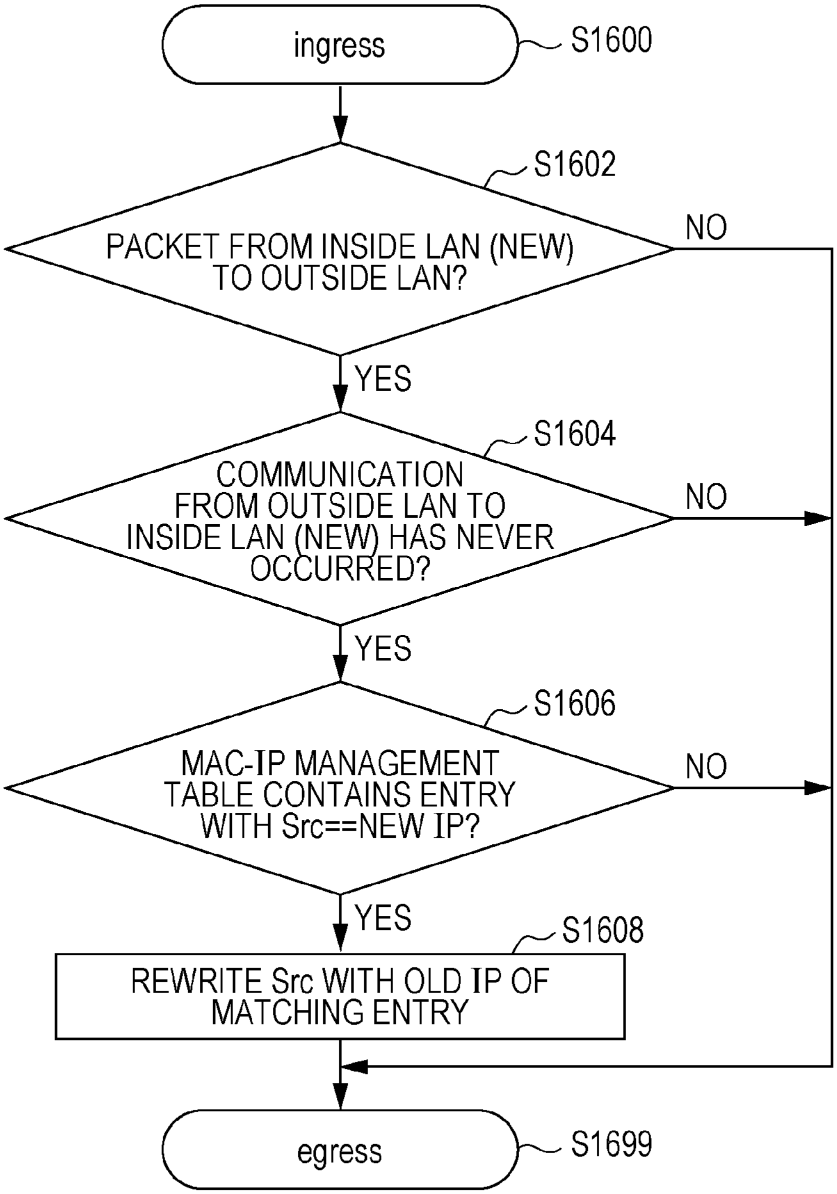
FIG. 16 is a flowchart illustrating an exemplary process according to the exemplary embodiment.

FIG. 16 is a flowchart illustrating an exemplary process according to the exemplary embodiment. FIG. 16 illustrates an exemplary process by the IP address rewriting module 115, and illustrates an exemplary process of packet communication from a terminal inside a LAN to a terminal outside the LAN.

In step S1602, it is determined whether or not a packet from a terminal inside the LAN (new IP address) to a terminal outside the LAN exists, and in the case where a packet from a terminal inside the LAN (new IP address) to a terminal outside the LAN exists, the flow proceeds to S1604, otherwise the process ends (step S1699).

In step S1604, it is determined whether communication from outside the LAN to inside the LAN (new IP address) has never occurred. If communication from outside the LAN to inside the LAN (new IP address) has never occurred, the flow proceeds to step S1606, otherwise the process ends (step S1699). For example, it is sufficient to make the determination using the new IP communication management table 900.

In step S1606, it is determined whether or not an entry satisfying "Src is new IP address" exists in the MAC-IP management table 500, and if so, the flow proceeds to step S1608, otherwise the process ends (step S1699).

In step S1608, Src is rewritten to the old IP address of the matching entry.

Note that a rewrite of the Dst of the return packet is omitted.

Figure 17:
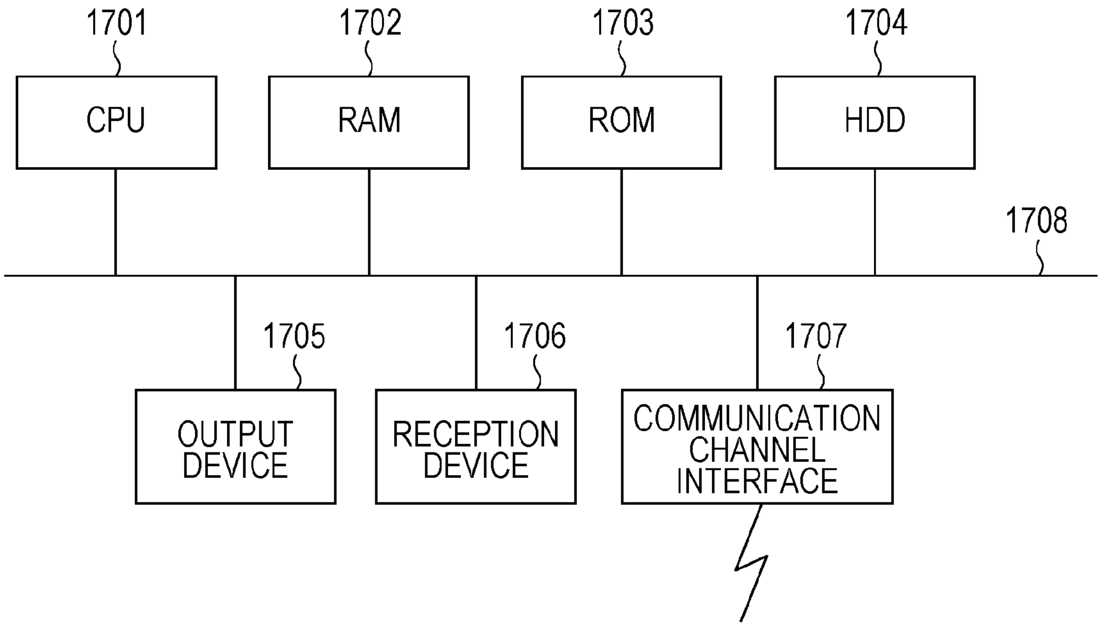
FIG. 17 is a block diagram illustrating an exemplary hardware configuration of a computer that realizes the exemplary embodiment.

Note that a hardware configuration of a computer executing a program that acts as the exemplary embodiment is a general computer as illustrated by the example of FIG. 17, and specifically is a computer or the like that may be a personal computer or a server. In other words, as a specific example, a CPU 1701 is used as a processing unit (computational unit), while RAM 1702, ROM 1703, and an HDD 1704 are used as storage devices. For the HDD 1704, a hard disk drive (HDD), a solid-state drive (SSD) that is flash memory, or the like may be used, for example. The computer includes the CPU 1701 that executes programs such as the address acquisition module 110, the IP address rewriting module 115, and the network interface module 120, the RAM 1702 that stores such programs and data, the ROM 1703 that stores programs and the like for booting the computer, the HDD 1704 which is an auxiliary storage device that includes the functions of new-old network information storage module 105 and the like, a reception device 1706 that receives data on the basis of operations performed by a user (including actions, voice commands, gaze, and the like) with respect to devices such as a keyboard, a mouse, a touchscreen, a microphone, and a camera (including a gaze detection camera or the like), an output device 1705 such as a liquid crystal display, an organic EL display, or a speaker, a communication channel interface 1707 such as a network interface card for connecting to a communication network, and a bus 1708 for joining and exchanging data with the above components. Multiple such computers may also be connected to each other by a network.

In the case of the foregoing exemplary embodiment being realized by a computer program, the computer program in the form of software is made to be read into a system with the above hardware configuration, and the foregoing exemplary embodiment is realized by the cooperative action of the software and hardware resources.

Note that the hardware configuration illustrated in FIG. 17 illustrates a single exemplary configuration, and that the exemplary embodiment is not limited to the configuration illustrated in FIG. 17 insofar as the configuration still enables execution of the modules described in the exemplary embodiment. For example, a graphics processing unit (GPU, also including general-purpose computing on graphics processing units (GPGPU)) may also be used as the processor. Some modules may also be realized with special-purpose hardware (such as an application-specific integrated circuit (ASIC) as a specific example) or a reconfigurable integrated circuit (such as a field-programmable gate array (FPGA) as a specific example). Some modules may be configured to reside within an external system and be connected via a communication channel. Furthermore, it may also be configured such that multiple instances of the system illustrated in FIG. 17 are connected to each other by a communication channel and operate in conjunction with each other. Additionally, besides a personal computer in particular, the exemplary embodiment may also be incorporated into a device such as a mobile information/communication device (including devices such as a mobile phone, a smartphone, mobile equipment, and a wearable computer), information appliance, robot, photocopier, fax machine, scanner, printer, or multi-function device.

Note that the described program may be provided stored in a recording medium, but the program may also be provided via a communication medium. In this case, a non-transitory computer readable recording medium storing a program, for example, may also be taken to be an exemplary embodiment of the present disclosure with respect to the described program.

A "non-transitory computer readable recording medium storing a program" refers to a non-transitory computer readable recording medium upon which a program is recorded, and which is used in order to install, execute, and distribute the program, for example.

Note that the recording medium may be a Digital Versatile Disc (DVD), encompassing formats such as DVD-R, DVD-RW, and DVD-RAM defined by the DVD Forum and formats such as DVD+R and DVD+RW defined by DVD+RW Alliance, a Compact Disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part or all of another program, or be recorded to a recording medium together with other separate programs. The above program may also be recorded in a split manner across multiple recording media. The above program may also be recorded in a compressed, encrypted, or any other recoverable form.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:

storage that, in a case where a change of network address occurs in a first communication channel, stores a pre-change network address in association with a post-change network address; and a controller that, in a case where communication from a second terminal device via a second communication channel to a first terminal device via the first communication channel is performed using the stored pre-change network address, controls the communication by using the storage such that, in a case where a network address associated with the second terminal device has not changed, the communication is performed as-is, whereas in a case where the network address associated with the second terminal device has changed, the pre-change network address associated with the first terminal device is converted to the post-change network address to communicate with the second terminal device, in a case where communication from the second terminal device via the second communication channel to the first terminal device via the first communication channel is performed using the stored post-change network address, controls the communication by using the storage such that, in a case where a network address associated with the first terminal device has changed, the communication is performed as-is, whereas in a case where the network address associated with the second terminal device has not changed, the post-change network address associated with the first terminal device is converted to the pre-change network address to communicate with the second terminal device.

2. The information processing device according to claim 1, wherein the controller causes the storage to store the pre-change network address for the first terminal device connected to a communication channel to be changed.

3. The information processing device according to claim 2, wherein in a case where a change of network address occurs in the communication channel, the controller detects the first terminal device whose network address has changed, and causes the storage to store the post-change network address of the first terminal device in association with the pre-change network address of the first terminal device.

4. The information processing device according to claim 1, wherein the storage stores information identifying the first terminal device, the pre-change network address of the first terminal device, and the post-change network address after the network address of the first terminal device changes in association with each other.

5. The information processing device according to claim 1, wherein in a case where there is communication from another first terminal device whose network address has changed to another second terminal device connected to another second communication channel to which the change of network address in the communication channel has not been applied, the controller controls the communication such that the network address of the other first terminal device is converted to the pre-change network address.

6. The information processing device according to claim 5, wherein in a case where there is communication from the other second terminal device to the pre-change network address of the other first terminal device, the controller controls the communication such that the network address of the other first terminal device is converted to the post-change network address.

7. The information processing device according to claim 1, wherein the controller causes a notification about applying the change of network address to be issued to another second terminal device that is using the pre-change network address to communicate with another first terminal device whose network address has changed.

8. The information processing device according to claim 7, wherein in a case where an elapsed time since the change of network address occurred in the other first terminal device or a number of other second terminal devices satisfies a predetermined condition, the controller causes the notification to be issued.

9. A non-transitory computer readable medium storing a program causing a computer to execute a process for processing information, the process comprising:

storing, in a case where a change of network address occurs in a first communication channel, a pre-change network address in association with a post-change network address; and controlling, in a case where communication from a second terminal device via a second communication channel to a first terminal device via the first communication channel is performed using the stored pre-change network address, the communication by using a storage such that, in a case where a network address associated with the second terminal device has not changed, the communication is performed as-is, whereas in a case where the network address associated with the second terminal device has changed, the pre-change network address associated with the first terminal device is converted to the post-change network address to communicate with the second terminal device, in a case where communication from the second terminal device via the second communication channel to the first terminal device via the first communication channel is performed using the stored post-change network address, the communication by using the storage such that, in a case where a network address associated with the first terminal device has changed, the communication is performed as-is, whereas in a case where the network address associated with the second terminal device has not changed, the post-change network address associated with the first terminal device is converted to the pre-change network address to communicate with the second terminal device.

10. An information processing device comprising:

a storing means for storing, in a case where a change of network address occurs in a first communication channel, a pre-change network address in association with a post-change; and a controlling means for controlling, in a case where communication from a second terminal device via a second communication channel to a first terminal device via the first communication channel is performed using stored the pre-change network address, the communication by using the storing means such that, in a case where a network address associated with the second terminal device has not changed, the communication is performed as-is, whereas in a case where the network address associated with the second terminal device has changed, the pre-change network address associated with the first terminal device is converted to the post-change network address to communicate with the second terminal device, in a case where communication from the second terminal device via the second communication channel to the first terminal device via the first communication channel is performed using the stored post-change network address, the communication by using the storing means such that, in a case where a network address associated with the first terminal device has changed, the communication is formed as-is, whereas in a case where the network address associated with the second terminal device has not changed, the post-change network address associated with the first terminal device is converted to the pre-change network address to communicate with the second terminal device.

* * * * *